United States Patent
Meuth

(10) Patent No.: US 10,626,686 B2
(45) Date of Patent: Apr. 21, 2020

(54) SKATE DRIVE SYSTEM FOR A CATWALK

(71) Applicant: FORUM US, INC., Houston, TX (US)

(72) Inventor: Joshua Brandon Meuth, Giddings, TX (US)

(73) Assignee: FORUM US, INC., Houston, TX (US)

( * ) Notice: Subject to any disclaimer, the term of this patent is extended or adjusted under 35 U.S.C. 154(b) by 42 days.

(21) Appl. No.: 15/952,542

(22) Filed: Apr. 13, 2018

(65) Prior Publication Data
US 2019/0316426 A1 Oct. 17, 2019

(51) Int. Cl.
| F16H 19/06 | (2006.01) |
| E21B 19/15 | (2006.01) |
| B66D 3/00 | (2006.01) |
| F15B 15/02 | (2006.01) |

(52) U.S. Cl.
CPC ............ *E21B 19/155* (2013.01); *B66D 3/006* (2013.01); *F15B 15/02* (2013.01); *F16H 19/06* (2013.01); *F16H 2019/0686* (2013.01)

(58) Field of Classification Search
CPC .... B66D 3/00; B66D 3/04; B66D 3/08; E21B 19/00; E21B 19/14; E21B 19/15; E21B 19/20; E21B 19/155; F15B 15/02; F15B 15/1471; F16H 19/06; F16H 2019/0686; B61J 3/06; B61J 3/08; B23B 13/02; B23B 13/123; B23Q 7/06; B65G 25/08; B65G 47/265; Y10T 82/2514; Y10T 82/2518; Y10T 82/2521
See application file for complete search history.

(56) References Cited

U.S. PATENT DOCUMENTS

| 3,028,819 A * | 4/1962 | Brosnan ................... B21D 7/14 104/176 |
| 3,377,961 A * | 4/1968 | Hunt ........................ B61J 3/08 104/162 |
| 3,568,825 A * | 3/1971 | Munger ................. B65G 25/08 198/746 |
| 3,695,185 A * | 10/1972 | Rose ........................ B61J 3/12 104/176 |
| 4,067,453 A * | 1/1978 | Moller ................. E21B 19/155 175/85 |
| 4,656,881 A * | 4/1987 | Goedecke ............. F15B 15/084 384/55 |
| 6,267,059 B1 * | 7/2001 | Brandt ................... B61D 47/00 104/162 |

(Continued)

FOREIGN PATENT DOCUMENTS

WO 2017/200655 A1 11/2017

OTHER PUBLICATIONS

International Search Report and Written Opinion dated Jun. 24, 2019, corresponding to Application Number PCT/US2019/025847.

*Primary Examiner* — Gregory W Adams
(74) *Attorney, Agent, or Firm* — Patterson + Sheridan, LLP

(57) ABSTRACT

A skate drive system for a catwalk having a skate and a clamping assembly. The system includes a primary actuator and a secondary actuator. The primary actuator is configured to apply a drive force to first and second cables to move the skate along a trough of the catwalk. The secondary actuator is configured to apply a tension force to at least one of the first and second cables independent of the primary actuator to actuate the clamping assembly from an unclamped position to a clamped position.

12 Claims, 6 Drawing Sheets

(56) References Cited

U.S. PATENT DOCUMENTS

| | | | | |
|---|---|---|---|---|
| 6,435,099 | B2 * | 8/2002 | Gunter | B61B 10/025 |
| | | | | 104/162 |
| 6,668,730 | B2 * | 12/2003 | Goldbeck | B61J 3/06 |
| | | | | 104/162 |
| 7,051,660 | B2 * | 5/2006 | Insana | B60M 7/003 |
| | | | | 104/162 |
| 8,840,352 | B2 * | 9/2014 | Taggart | E21B 19/155 |
| | | | | 414/22.54 |
| 9,476,265 | B2 * | 10/2016 | Tetley | E21B 19/15 |
| 9,476,266 | B2 * | 10/2016 | Swanson | E21B 19/15 |

\* cited by examiner

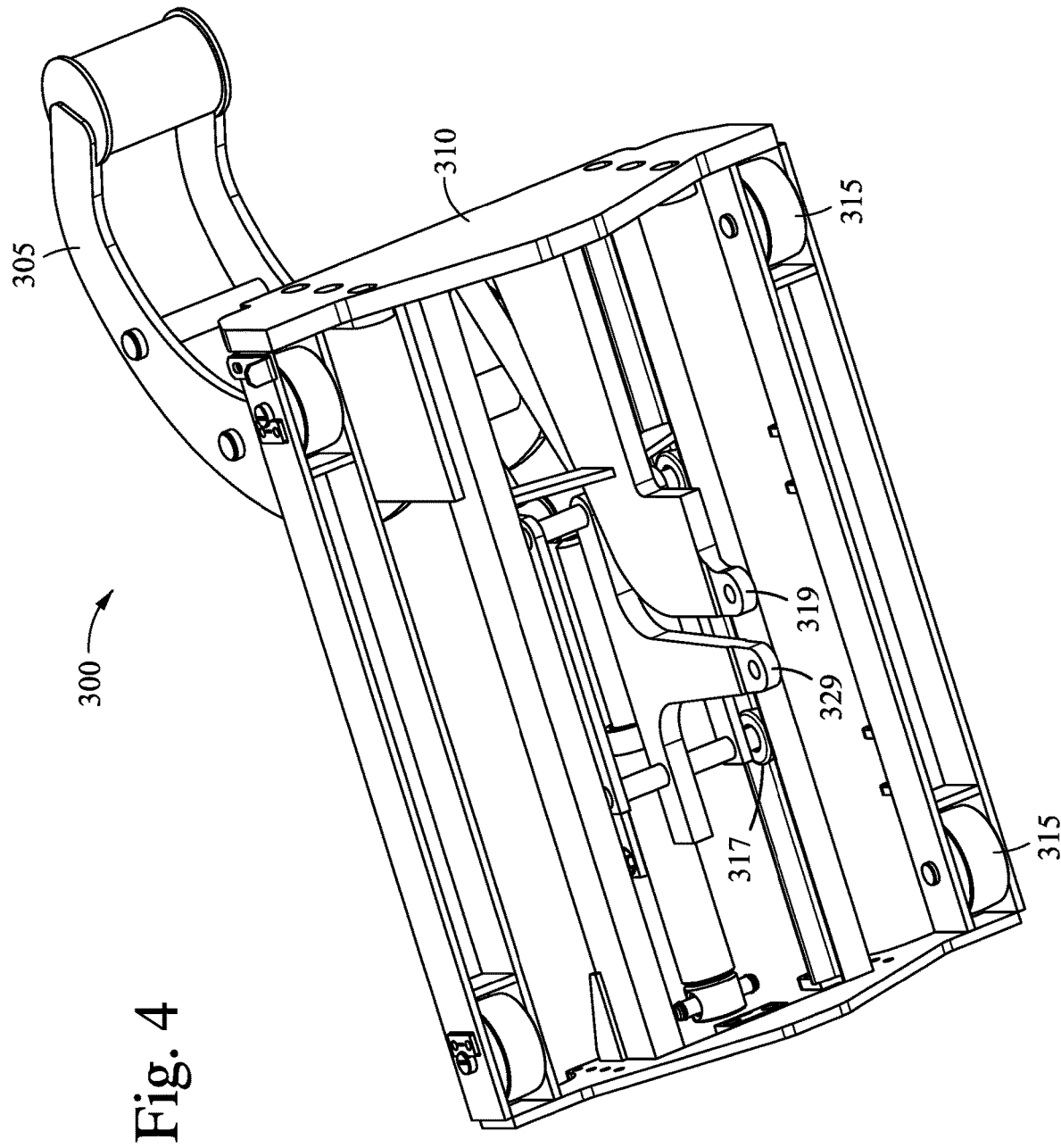

SKATE DRIVE SYSTEM FOR A CATWALK

BACKGROUND

Field

Embodiments of the disclosure generally relate to catwalks for conveying pipe and other tubulars to a drill floor from a lower section of a drilling rig or drill site. Specifically, embodiments of the disclosure relate to a skate drive system for a catwalk.

Description of the Related Art

In a drilling operation or rig work-over operation, whether on a water-based or land-based drilling rig, pipe for the drilling operation, casing, or other tubulars are often stored at or supplied from a pipe deck at a level that is lower than the drill floor. Operators typically use a "catwalk" to convey the pipe from the pipe deck to the drill floor, and to return pipe to the pipe deck after use. The catwalk typically has a trough that holds the pipe when being transferred to and from the drill floor. The pipe is typically mechanically transported from a level below the rig floor to the rig floor.

Prior art catwalks use a skate drive system having two hydraulically actuated cylinders positioned on either side of a trough of the catwalk that are configured to move a skate that pushes or pulls pipe along the trough. Some prior art systems also have complex tubular clamping systems that trail the skate as it moves along the trough and which require additional actuating components dedicated solely to the tubular clamping system. Such prior art systems are costly, add weight to the catwalk, and are difficult to operate over the entire length of the trough.

There is a need therefore for new and improved skate drive systems for catwalks.

SUMMARY

In one embodiment, a skate drive system for a catwalk comprises a skate configured to move a tubular along a trough of the catwalk; a clamp assembly coupled to the skate and configured to clamp the tubular to the skate; a primary actuator coupled to the clamp assembly by a first cable and a second cable, wherein the primary actuator is configured to move the skate and the clamp assembly via the first and second cables along the trough; and a secondary actuator coupled to at least one of the first and second cables and configured to apply a tension force to at least one of the first and second cables to move the clamp assembly between an unclamped position and a clamped position.

In one embodiment, a method actuating a skate drive system of a catwalk comprises actuating a primary actuator to apply a drive force to a first cable to move a skate and a clamping assembly along a trough of the catwalk in a first direction; actuating the primary actuator to apply a drive force to a second cable to move the skate and the clamping assembly along the trough in a second, opposite direction; and actuating a secondary actuator independent of the primary actuator to apply a tension force to at least one of the first and second cables to move the clamp assembly from an unclamped position to a clamped position to clamp a tubular to the skate.

BRIEF DESCRIPTION OF THE DRAWINGS

The appended drawings illustrate only typical embodiments and are therefore not to be considered limiting of the scope of the disclosure.

FIG. 4 shows a second perspective view from below of the skate with the clamping assembly in the open, unclamped position.

DETAILED DESCRIPTION

Figure 1:
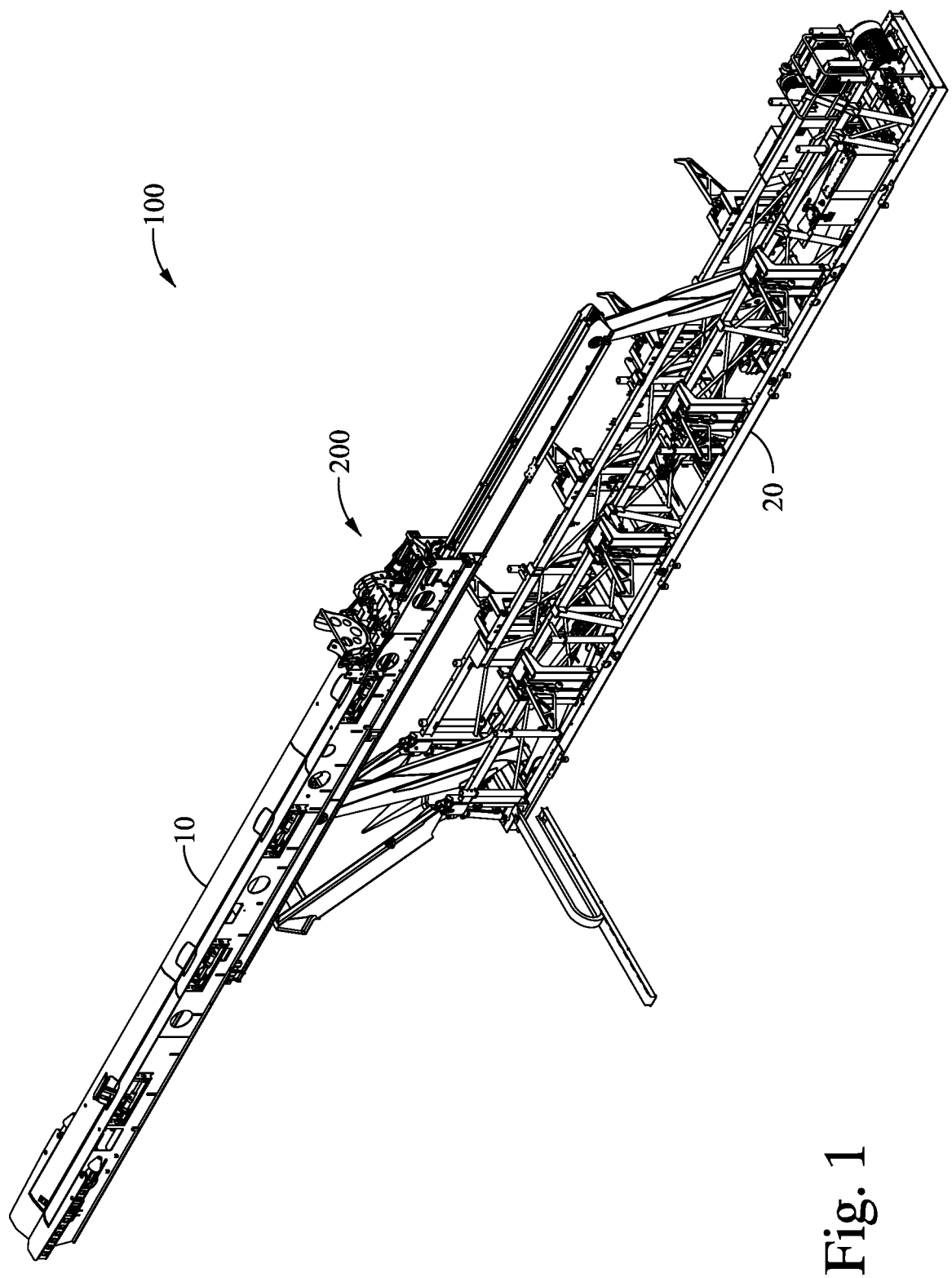
FIG. 1 shows a catwalk in a raised position.

FIG. 1 shows a catwalk 100 having a trough 10 in a raised position that is supported by a frame 20, according to one embodiment. The catwalk 100 is configured to convey tubulars, such as pipe, between a lower pipe deck level or ground level, and a higher rig floor level. The pipe is pushed along the trough 10 by a skate drive system 200 when removing the pipe from the trough 10 onto the higher rig floor level. The pipe is pulled by the skate drive system 200 when placing the pipe back into the trough 10 from the higher rig floor level.

Figure 2:
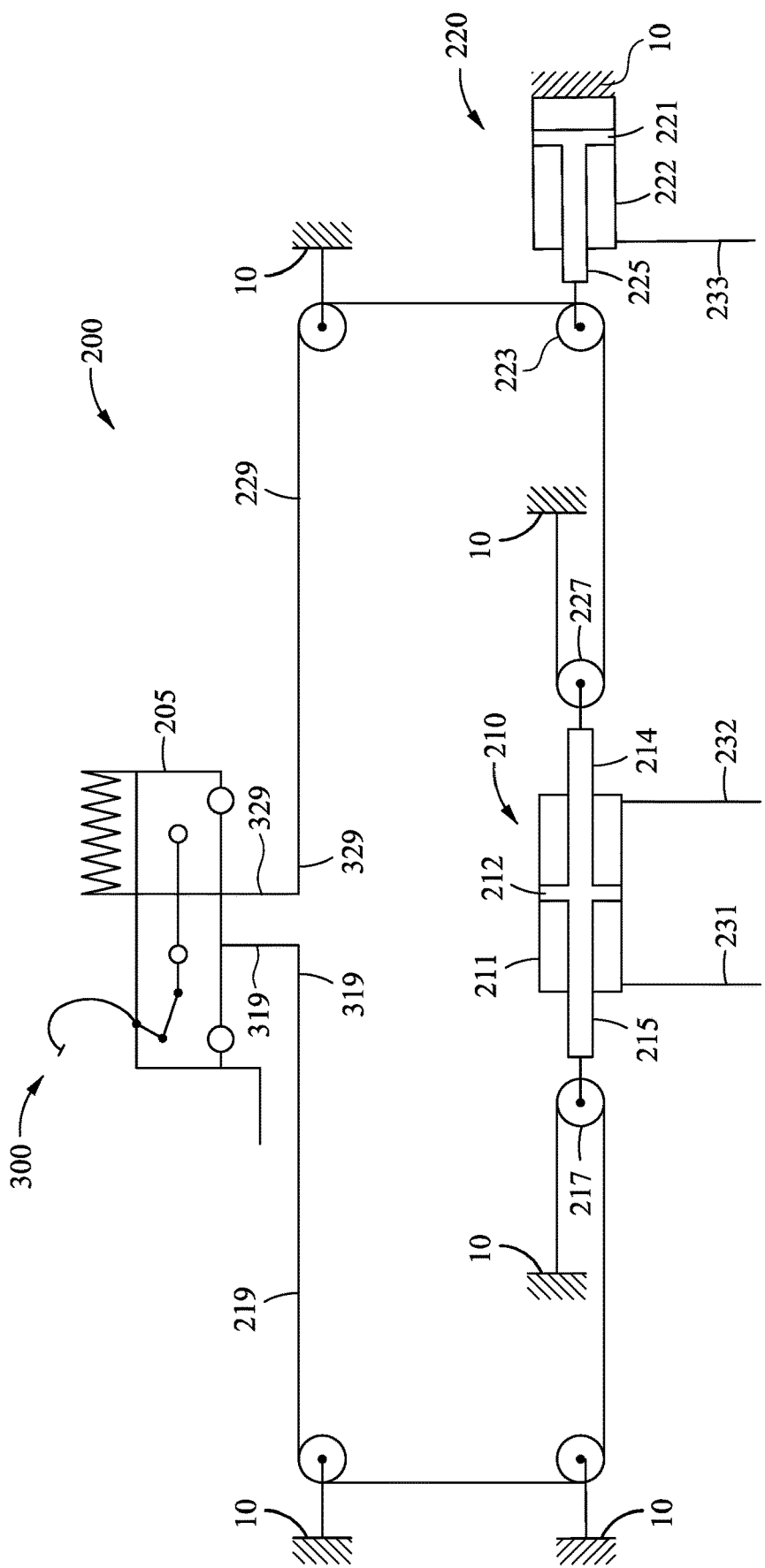
FIG. 2 shows a schematic view of a skate drive system according to one embodiment.

FIG. 2 shows a schematic view of the skate drive system 200 with the trough 10, the frame 20, and other components of the catwalk 100 removed for clarity. The components of the skate drive system 200 discussed below are centrally located along the center axis of the trough 10, which provides a more streamlined arrangement and helps reduce the overall weight and complexity of the catwalk 100.

The skate drive system 200 includes a skate 205 configured to push or pull a pipe along the trough 10. The skate drive system 200 further includes a clamping assembly 300 configured to clamp the pipe to the skate 205 so that the pipe moves with the skate 205 along the trough 10. The skate 205 is coupled to the clamping assembly 300 such that they move together during operation. The skate 205 may move along the trough 10 with the clamping assembly 300 in either an open position or a clamped position as further described below.

The skate drive system 200 further includes a primary actuator 210 configured to move the skate 205 and the clamping assembly 300 along the trough 10. The primary actuator 210 is a single, double acting hydraulic cylinder. The primary actuator 210 includes a cylinder 211, a piston 212 disposed in the cylinder 210, a first moving member 215 coupled to the piston 212, and a second moving member 214 coupled to the piston 212. Although the primary actuator 210 is shown as a single, double acting hydraulic cylinder, the primary actuator 210 can be a linear or rotary actuator, such as a winch. In one embodiment, the skate drive system 200 includes a single primary actuator 210. In one embodiment, the skate drive system 200 includes a pair of primary actuators 210, each of which separately or in combination with the other primary actuator 210 can move the skate 205 and the clamping assembly 300 along the trough 10 in both directions as described herein.

The first moving member 215, such as a rod, extends out of the cylinder 211 and is coupled to a first connection member 319 of the clamping assembly 300 by a first cable 219. One end of the first cable 219 is coupled to the first connection member 319 and the opposite end of the first cable 219 is coupled to the trough 10. The first cable 219 wraps around at least a first sheave 217 that is coupled to the first moving member 215 and may wrap around any other number of sheaves positioned between the first connection member 319 and the trough 10 to help move the skate 205 and the clamping assembly 300 along the trough 10.

The second moving member 214, such as a rod, extends out of an opposite end of the cylinder 211 and is coupled to a second connection member 329 of the clamping assembly 300 by a second cable 229. One end of the second cable 229 is coupled to the second connection member 329 and the opposite end of the second cable 229 is coupled to the trough 10. The second cable 229 wraps around at least a second sheave 227 that is coupled to the second moving member 214 and may wrap around any other number of sheaves positioned between the second connection member 329 and the trough 10 to help move the skate 205 along the trough 10.

The primary actuator 210 is configured to apply a drive force to at least one of the first and second cables 219, 229 to move the skate 205 and the clamping assembly 300 along the trough 10. When the forces applied to the first and second cables 219, 229 by the primary actuator 210 are equal or no force is applied, the skate 205 remains stationary. When a differential force (or pressure) exists on opposite sides of the piston 212, the skate 205 is moved along the trough 10. Pressurized fluid may be supplied in the cylinder 211 on either side of the piston via fluid paths 231, 232.

Pressurized fluid can be supplied into the cylinder 211 on one side of the piston 212 via a fluid path 231 to retract the first moving member 215, which pulls on the first cable 219 to move the skate 205 along the trough 10 in a first direction. As the first moving member 215 is retracted, the second moving member 214 is extended and fluid in the cylinder 211 on the other side of the piston 212 may flow out of the cylinder 211 via a fluid path 232. When moving in the first direction, the skate 205 may be pushing a pipe along the trough 10. When the skate 205 is pushing the pipe, the clamping assembly 300 may be actuated into an open position.

To move the skate 205 along the trough 10 in a second, opposite direction, pressurized fluid is supplied into the cylinder 211 on the opposite side of the piston 212 via the fluid path 232 to retract the second moving member 214, which pulls on the second cable 229. As the second moving member 214 is retracted, the first moving member 215 is extended and fluid in the cylinder 211 on the other side of the piston 212 may flow out of the cylinder 211 via the fluid path 231. When moving in the second, opposite direction, the skate 205 may be pulling the pipe along the trough 10. When the skate 205 is pulling the pipe, the clamping assembly 300 may be actuated into a closed, clamped position to clamp the pipe to the skate 205.

The clamping assembly 300 is normally maintained in the open, unclamped position, and is actuated into the closed, clamped position when a predetermined amount of tension is applied to the first and second cables 219, 229. When the amount of tension in the first and second cables 219, 229 falls below the predetermined amount, the clamping assembly 300 is biased back into the open, unclamped position.

A separate, secondary actuator 220 of the skate drive system 200 is used to add tension to at least one of the first and second cables 219, 229 to actuate the clamping assembly 300 into the closed, clamped position independent of the drive force applied by the primary actuator 210 to move the skate 205. In this manner, the drive force used to move the skate 205 is independent of the tension force used to actuate the clamping assembly 300 into the closed, clamped position. In one embodiment, the skate drive system 200 includes a single secondary actuator 220. In one embodiment, the skate drive system 200 includes a pair of secondary actuators 220, each of which separately or in combination with the other secondary actuator 220 can add tension to at least one of the first and second cables 219, 229 to actuate the clamping assembly 300 as described herein.

The secondary actuator 220 includes a cylinder 222, a piston 221 disposed in the cylinder 222, and a moving member 225, such as a rod, coupled to the piston 221 at one end and to a sheave 223 at an opposite end. At least a portion of the second cable 229 wraps around the sheave 223. The secondary actuator 220 is coupled to the trough 10. Although the secondary actuator 220 is shown as being directly coupled to the second cable 229, the secondary actuator 220 or even another actuator may be coupled to the first cable 219 to apply tension to the first and second cables 219, 229. Although the secondary actuator 220 is shown as a single acting hydraulic cylinder, the secondary actuator 220 can be a linear or rotary actuator, such as a winch.

Pressurized fluid can be supplied into or returned from the cylinder 222 on one side of the piston 221 via fluid path 233 to retract the moving member 225 into the cylinder 222. Since at least a portion of the second cable 229 wraps around the sheave 223 that is coupled to the moving member 225, a tension force can be applied to the first and second cables 219, 229 by the secondary actuator 220 when the moving member 225 is retracted into the cylinder 222. The tension applied to the first and second cables 219, 229 by the secondary actuator 220 is configured to actuate the clamping assembly 300 into the closed, clamped position as further described below with respect to FIGS. 3, 4, 5A, and 5B.

Figure 3:
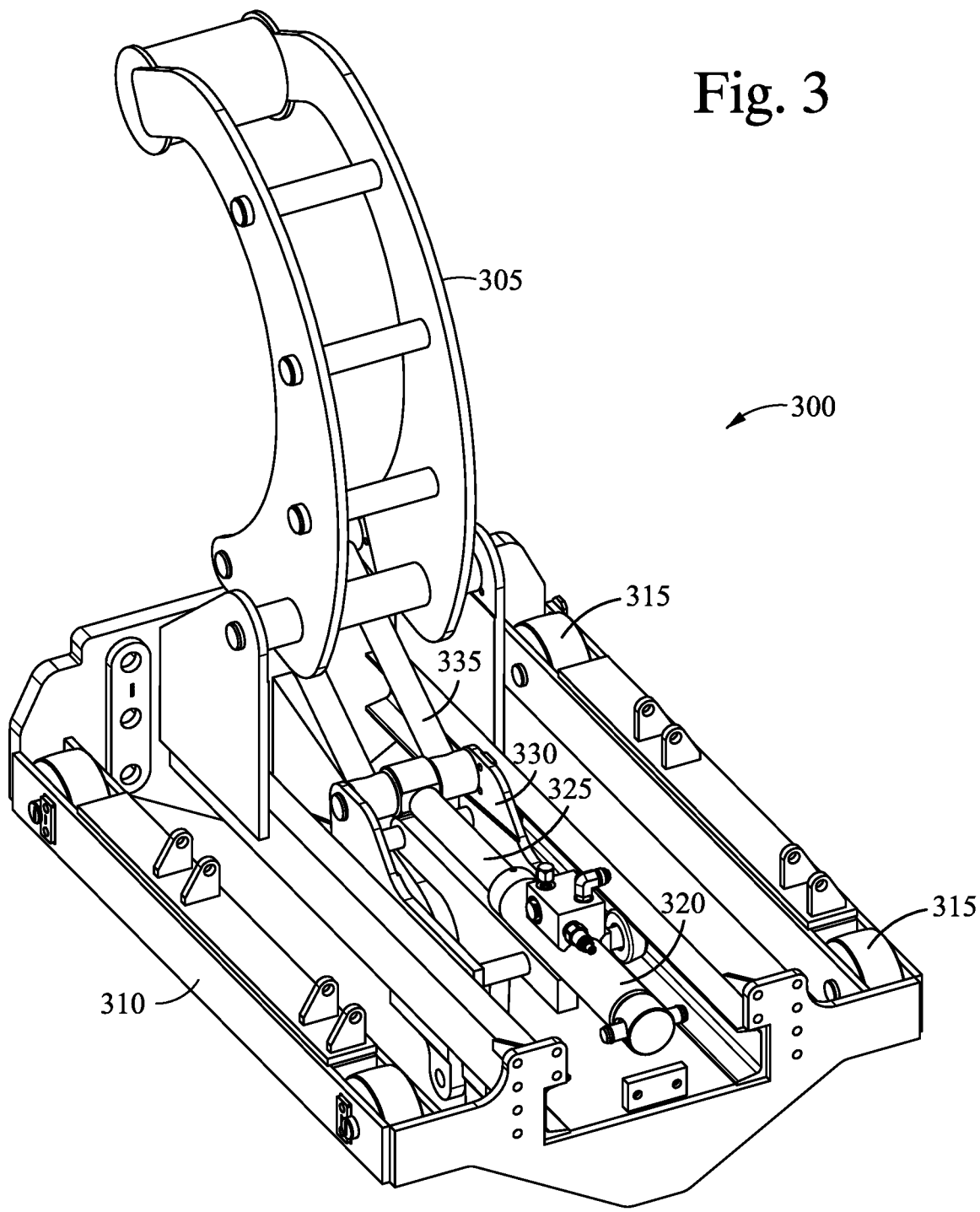
FIG. 3 shows a first perspective view from above of a skate with a clamping assembly shown in an open, unclamped position.
Figure 5A:
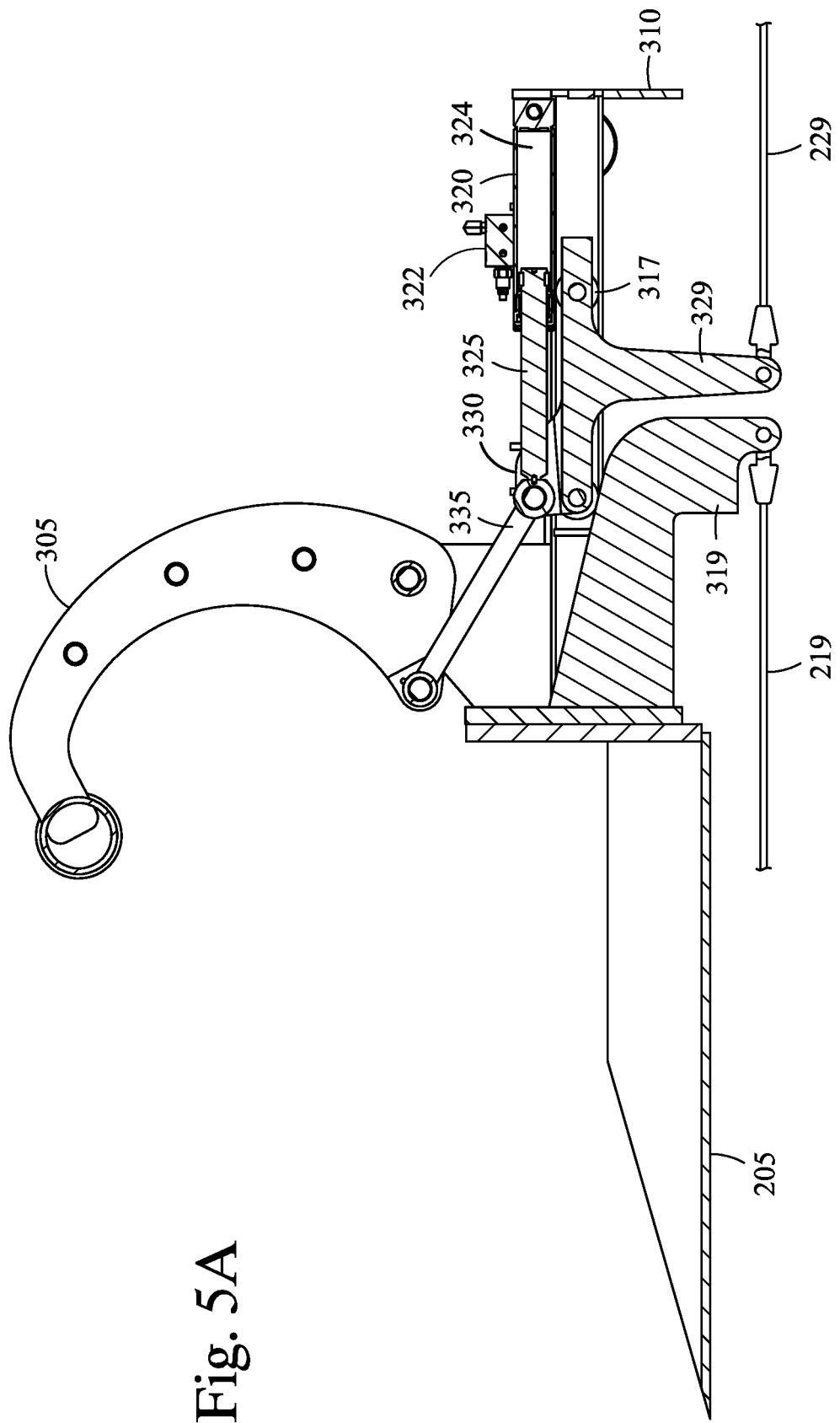
FIG. 5A shows a cross section of the skate with the clamping assembly in the open, unclamped position.
Figure 5B:
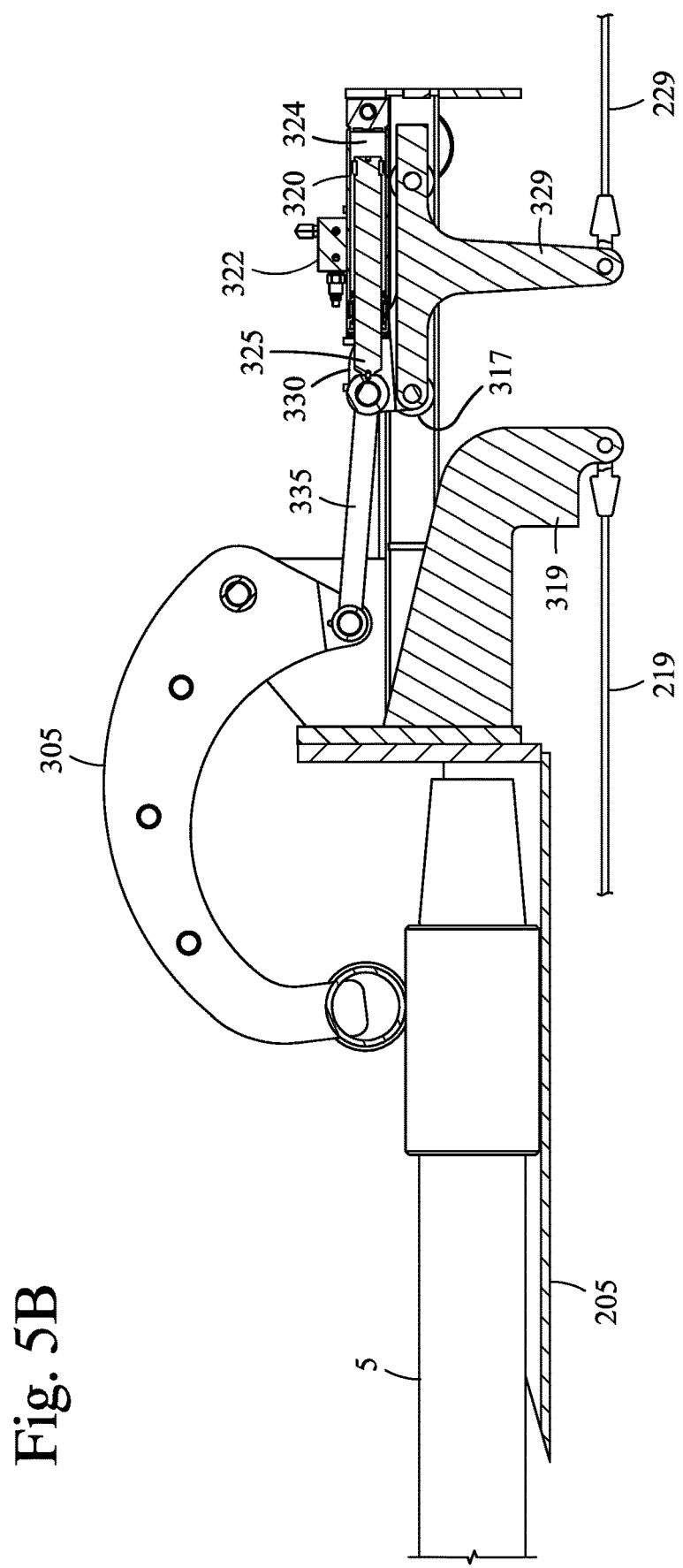
FIG. 5B shows a cross section of the skate with the clamping assembly in a closed, clamped position.

FIGS. 3 and 4 show perspective views of the clamping assembly 300 in an open position. FIG. 5A shows a cross section of the skate 205 with the clamping assembly 300 in the open, unclamped position. FIG. 5B shows a cross section of the skate 205 with the clamping assembly 300 in a closed, clamped position. Some of the components of the clamping assembly 300 have been removed for clarity.

Referring to FIGS. 3, 4, 5A, and 5B, the clamping assembly 300 includes a clamp 305 pivotably coupled to a skate frame 310 having one or more rollers 315 configured to roll along the trough 10 during operation. The skate 205 is also coupled to the skate frame 310 adjacent to the clamp 305. The first connection member 319 is coupled to the skate frame 310, and the second connection member 329 is coupled to an actuating carriage 330 of the clamping assembly 300.

The clamping assembly 300 also includes a biasing device 320, shown as a hydraulic cylinder, coupled to the skate frame 310 and having a third moving member 325, such as a rod, that is retracted into and extended from the biasing device 320. In an alternative embodiment, the biasing device 320 may be or include a passive spring or a spring-and-damper device. The third moving member 325 is coupled to the clamp 305 by one or more connecting rods 335. The third moving member 325 and the connecting rods 335 are each coupled to the actuating carriage 330, which has one or more rollers 317 configured to roll along rails located within the skate frame 310. As noted above, the second connection member 329 is coupled to the actuating carriage 330.

Referring to FIG. 5A, the first cable 219 is coupled to the first connection member 319, which is coupled to the skate frame 310, and the second cable 229 is coupled to the second connection member 329, which is coupled to the actuating carriage 330. The cables 219, 229 are maintained in tension by the primary actuator 210 as the skate 205 is moved in either direction along the trough 10. Although the first and second cables 219, 229 are in tension, the biasing device 320 may maintain the clamp 305 in the open, unclamped position.

Pressurized fluid may be supplied through a valve 322 into a chamber 324 of the biasing device 320, such as by an accumulator, to force the third moving member 325 to extend out from the biasing device 320. The valve 322 (and optionally the accumulator) may be coupled to the skate frame 310. As the third moving member 325 is moved out of the biasing device 320, the connecting rods 335 are moved to pivot the clamp 305 to the open, unclamped position. When the tension in the first and second cables 219, 229 is less than the force applied by the biasing device 320 to the clamp 305 (referred to as a clamping threshold force), the clamp 305 is maintained in the open position. The clamp 305 is maintained in the open position until a tension force applied to the first and second cables 219, 229 exceeds and is greater than the force applied to the clamp 305 by the biasing device 320.

Referring to FIG. 5B, a tension force may be added to the first and second connection members 319, 329 via the first and second cables 219, 229 by the secondary actuator 220 that is greater than the clamping threshold force applied by the biasing device 320. The tension force applied to the first and second cables 219, 229 by the secondary actuator 220 pulls the second connection member 329 away from the first connection member 319, such that the actuating carriage 330 moves relative to the skate frame 310 and forces the third moving member 325 to retract into the biasing device 320 against the force of the pressurized fluid in the chamber 324. The pressurized fluid in the chamber 324 may flow out through the valve 322, such as back into the accumulator. As the third moving member 325 is retracted, the connecting rods 335 are also moved with the actuating carriage 330 to pivot the clamp 305 to the closed, clamped position to engage and clamp a pipe 5 to the skate 205.

The pressure within the biasing device 320 (which may be maintained by an accumulator) may be used to set the clamping threshold force necessary to actuate the clamping assembly 300 from the open, unclamped position to the closed, clamped position. The tension force in the first and second cables 219, 229 must be greater than the clamping threshold force to retract the third moving member 325 and move the clamp 305 to the clamped position. When the tension force in the first and second cables 219, 229 is less than the clamping threshold force, the pressurized fluid flows back into the chamber 324 of the biasing device 320 to extend the third moving member 325 back out of the biasing device 320 and thereby move the clamp 305 to the open, unclamped position. In this manner, the clamping assembly 300 is remotely actuatable by the secondary actuator 220 independent of the primary actuator 210 during operation.

While the foregoing is directed to some embodiments, other and further embodiments may be devised without departing from the basic scope thereof, and the scope thereof is determined by the claims that follow.

The invention claimed is:

1. A skate drive system for a catwalk, comprising:
a skate configured to move a tubular along a trough of the catwalk;
a clamp assembly coupled to the skate and configured to clamp the tubular to the skate;
a primary actuator coupled to the clamp assembly by a first cable and a second cable, wherein the primary actuator is configured to move the skate and the clamp assembly via the first and second cables along the trough;
a secondary actuator coupled to at least one of the first or second cables and configured to apply a tension force to at least one of the first or second cables to move the clamp assembly between an unclamped position and a clamped position;
a biasing device configured to apply a clamping threshold force to the clamp assembly to bias the clamp assembly into the unclamped position, wherein the clamp assembly is moved to the unclamped position when the tension force applied to at least one of the first or second cables is less than the clamping threshold force, wherein the clamp assembly is moved to the clamped position when the tension force applied to at least one of the first or second cables is greater than the clamping threshold force, wherein the biasing device has a third moving member coupled to the clamp assembly, and wherein the third moving member is extended from and retracted into the biasing device.

2. The skate drive system of claim 1, wherein the tension force applied by the secondary actuator is independent of a drive force applied by the primary actuator configured to move the skate and clamping assembly along the trough.

3. The skate drive system of claim 1, wherein the third moving member is coupled to the clamp assembly by one or more connecting rods configured to pivot the clamp assembly between the unclamped position and the clamped position.

4. The skate drive system of claim 3, wherein the clamp assembly is moved to the clamped position when the third moving member is retracted into the biasing device.

5. The skate drive system of claim 4, wherein the clamp assembly is moved to the unclamped position when the third moving member is extended from the biasing device.

6. The skate drive system of claim 5, wherein the biasing device is pressurized to extend the third moving member from the biasing device.

7. The skate drive system of claim 1, wherein the primary actuator is a double acting hydraulic cylinder.

8. A method of actuating a skate drive system of a catwalk, comprising:
actuating a primary actuator to apply a drive force to a first cable to move a skate and a clamping assembly along a trough of the catwalk in a first direction;
actuating the primary actuator to apply a drive force to a second cable to move the skate and the clamping assembly along the trough in a second, opposite direction;
actuating a secondary actuator independent of the primary actuator to apply a tension force to at least one of the first or second cables to move the clamp assembly from an unclamped position to a clamped position to clamp a tubular to the skate; and
applying a clamping threshold force to the clamp assembly by a biasing device to move the clamp assembly to the unclamped position, wherein the biasing device includes a cylinder and a moving member that is extended from the cylinder by pressurized fluid to move the clamp assembly to the unclamped position.

9. The method of claim 8, wherein when the tension force applied to at least one of the first or second cables exceeds the clamping threshold force, the moving member is retracted into the cylinder to move the clamp assembly to the clamped position.

10. The method of claim 9, further comprising moving the skate in the first direction to push a tubular along the trough while the clamp assembly is in the unclamped position.

11. The method of claim 10, further comprising moving the skate in the second, opposite direction to pull the tubular along the trough while the clamp assembly is in the clamped position.

12. The method of claim 8, wherein the primary actuator is a double acting hydraulic cylinder.

\* \* \* \* \*